United States Patent Office 3,450,664
Patented June 17, 1969

3,450,664
PROCESS FOR PREPARING DELUSTERED POLYPIVALOLACTONE
Jack Alleavitch, Raleigh, N.C., assignor to E. I. du Pont de Nemours and Company, Wilmington, Del., a corporation of Delaware
No Drawing. Filed Oct. 13, 1965, Ser. No. 495,726
Int. Cl. D01f 7/04, 1/04; C08g 17/017
U.S. Cl. 260—37          4 Claims

ABSTRACT OF THE DISCLOSURE

A method for preparing delustered polypivalolactone by the addition of titanium dioxide during the induction period of the polymerization reaction, i.e., the elapsed time between the addition of pivalolactone and the separation of polymer. The pivalolactone is mixed with a polymerization initiator and a liquid hydrocarbon, and about 0.1 to 2 weight percent of titanium dioxide (based on the pivalolactone) is added prior to the separation of more than about 10% of polypivalolactone from the reaction mixture.

---

This invention relates to the manufacture of delustered polypivalolactone.

Pivalolactone polymerizes in the presence of a suitable initiator to form polypivalolactone, a polymer of high utility for preparing textile fibers adaptable for a wide variety of uses. The polymerization reaction proceeds with the evolution of much heat. It has been found that the polymer can be manufactured readily on a large scale by using a sufficient quantity of a volatile hydrocarbon as a diluent, e.g., a hydrocarbon having a boiling point of about 50°–150° C. Refluxing of the volatile hydrocarbon diluent permits maintaining the reaction under control. For economic reasons, a highly active initiator such as tetrabutylammonium hydroxide is generally employed, the pivalolactone being added to a solution of the initiator in the hydrocarbon. After a brief induction period, frequently of the order of only a few seconds, polymerization begins and the hydrocarbon diluent begins to reflux. The reaction product, polypivalolactone, is insoluble in hydrocarbons and begins to separate as a solid precipitate almost immediately. As used herein, the term "induction period" is, therefore, defined as the elapsed time between the addition of pivalolactone and the separation of polymer.

In the manufacture of synthetic fibers, it is customary to employ $TiO_2$ as a delusterant, thereby increasing the whiteness and the opacity or "cover" of fabrics made from the fibers. While attempts have been made to add the $TiO_2$ to synthetic polymers after the polymers have been formed, it has been found that very poor dispersion of the $TiO_2$ in the polymers is obtained in this way. Accordingly, the $TiO_2$ is usually added in admixture with the other starting materials.

Attempts have been made to prepare delustered polypivalolactone by mixing $TiO_2$ with the hydrocarbon diluent and initiator followed by the addition of pivalolactone and the rapid polymerization thereof as described above. Unfortunately, it has been found that the $TiO_2$ in such delustered polymer is very poorly dispersed. The poor dispersion of the $TiO_2$ in the polymer results in difficulties in spinning, necessitating frequent cleaning and reassembling of the spinneret packs. Another result is that fibers spun from the nonuniform polymer perform erratically in the drawing step and contain fiber defects apparent in fabrics made from the fibers.

It has now been found that uniformly delustered polypivalolactone can be obtained by adding from about 0.1 to about 2 weight per cent of $TiO_2$ based on the weight of the pivalolactone monomer to the reaction mixture as the last ingredient, during the induction period of the polymerization reaction.

In accordance with the invention, the improvement consists of combining one part by volume of pivalolactone with a mixture of the initiator and from about one to about ten parts by volume of a liquid hydrocarbon free from aliphatic unsaturation and having a boiling point in the range of 50 to 150° C. and adding the $TiO_2$ to the reaction mixture prior to the separation of polymer from the reaction mixture. The ingredients are generally combined with agitation. The $TiO_2$ is preferably dispersed in a small amount of pivalolactone which is then added to the solution of the pivalolactone in the hydrocarbon. The total amount of pivalolactone in the reaction mixture is preferably no more than about one part by volume for each part by volume of the hydrocarbon.

As previously stated, the induction period of the polymerization reaction is usually brief and separation of the solid polymer, polypivalolactone, begins quickly. For optimum results, the $TiO_2$ should be added prior to the separation of polymer from the solution. However, acceptable dispersion of the delusterant is obtained as long as the $TiO_2$ is added to the reaction mixture before a substantial amount of polymer separates; i.e., before more than about 10% of the polymer separates. In practice, it is highly desirable to add the $TiO_2$ to the mixture by the time the rate of evolution of heat from the polymerization reaction becomes sufficient to maintain refluxing without supplementary application of heat since the rate of polymer formation and separation becomes quite rapid at this time.

Various compounds are suitable as initiators for the polymerization of pivalolactone. Included are various tertiary amines and quaternary ammonium compounds such as triethylenediamine, tetrabutylammonium hydooxide, tetrabutylammonium bromide, tetraheptylammonium iodide, and tetraethylammonium chloride. The concentration of the initiator is usually in the range of about 0.01–1 mol percent, based on the pivalolactone.

The following examples will serve to illustrate the invention, although they are not intended to be limitative. In the examples, the term "inherent viscosity" is defined as the polymer property determined in accordance with the following relationship:

$$\eta_{inh.} = \frac{\ln \eta_{rel.}}{c}$$

wherein the relative viscosity, $\eta_{rel}$, is calculated by dividing the flow time in a capillary viscometer of a dilute solution of the polymer by the flow time of the pure solvent, trifluoroacetic acid, all at room temperature. The concentration (c) of the dilute solution used in the examples is 0.5 gram of polymer per 100 ml. of solution.

EXAMPLE 1

A slurry of 0.15 g. of $TiO_2$ in 20 ml. (19.6 g., 0.196 mol) of pivalolactone is prepared, using a high speed mechanical mixture (Waring Blendor). One hundred and eighty (180) ml. of filtered hexane is placed in a flask equipped with a mechanical stirrer and a condenser. Stirring is begun and 0.8 ml. of a 0.25 molar solution of tetrabutylammonium bromide in tetrahydrofuran is added. Thirty ml. (29.4 g., 0.294 mol) of pivalolactone is added and mixed therewith, followed immediately by the slurry of $TiO_2$ in the remaining pivalolactone and an additional 20 ml. of hexane as a wash. Polymerization begins almost immediately, with refluxing of the hexane and separation of the solid polymeric precipitate. Heating is continued as required to maintain refluxing for 1.5 hours, with continuous stirring. The solid product, polypivalolactone delusted with $TiO_2$, is filtered off and dried for 10 hours at 60° C. under a pressure of 380 mm. of mercury. The polymer has an inherent viscosity of 2.78. A film melt pressed at 280° C. and under a pressure of 6,000 p.s.i. for 30 seconds appears quite uniform, with good dispersion of the $TiO_2$.

In a comparative experiment, 180 ml. of filtered hexane is placed in a flask equipped with a mechanical stirrer and a condenser. Stirring is begun and 0.8 ml. of a 0.25 molar solution of tetrabutylammonium bromide in tetrahydrofuran is added, followed by a slurry of 0.15 g. of $TiO_2$ in 20 ml. of pivalolactone. Finally, an additional quantity of 30 ml. of pivalolactone and 20 ml. of hexane as a wash are added. Rapid polymerization begins, and the reaction is continued for 1.5 hours with continuous stirring and refluxing of the hexane. The solid product is dried as described above. The polymer has an inherent viscosity of 3.30. A film of this polymer melt-pressed at 280° C. and under a pressure of 6,000 p.s.i. for 30 seconds is observed to have a very poor dispersion of the $TiO_2$, with streaks and large agglomerates being readily discernible.

EXAMPLE 2

A solution of 50 ml. of 1.0 molar tetrabutylammonium bromide in methanol is added to 55.8 liters (15 gallons) of hexane. The mixture is agitated and 13.65 liters (29.5 lbs.) of pivalolactone is added and mixed therewith, followed by a dispersion of 40.4 g. of $TiO_2$ in 0.2 liter of pivalolactone. The mixture is heated with continuous agitation and refluxing commences within about 10 minutes. Additional heat is added as required to continue refluxing for 1.75 hours. The mixture is then cooled and the slurry of solid product, delustered polypivalolactone, is filtered off and dried at 100° C. for 8 hours under vacuum. The inherent viscosity of the polymer is 2.3 and the yield is 96%. A film melt-pressed from this polymer appears quite uniform, with good dispersion of the $TiO_2$.

In a comparative run the order of addition of the dispersion of $TiO_2$ in 0.2 liter of pivalolactone and the main portion of 13.65 liters of pivalolactone is reversed. In other respects the procedure employed is the same, except that in this instance the initiator employed is 113 ml. of 1.0 molar tetrabutylammonium hydroxide in methanol. The inherent viscosity of the polymer is 1.8 and the yield is 90%. A film melt-pressed from this polymer is observed to have a very poor dispersion of $TiO_2$, with streaks and large particles being readily apparent.

What is claimed is:

1. In a method for preparing delustered polypivalolactone by polymerizing pivalolactone and recovering solid polypivalolactone, the improvement which comprises: mixing one part by volume of pivalolactone with the combination of a polymerization initiator and from about 1 to about 10 parts by volume of a liquid hydrocarbon free from aliphatic unsaturation and having a boiling point in the range of 50–150° C. and adding to the reaction mixture from about 0.1 to about 2 weight percent titanium dioxide based on the pivalolactone, prior to the separation of more than about 10% of polypivalolactone from the reaction mixture.

2. The process of claim 1 wherein the titanium dioxide is added before any of the polymer separates.

3. The process of claim 1 wherein the concentration of the initiator is in the range of about 0.01 and one mole percent based on the pivalolactone.

4. The process of claim 3 wherein the initiator is tetrabutyl ammonium bromide and the hydrocarbon solvent is hexane.

References Cited

UNITED STATES PATENTS

| | | | |
|---|---|---|---|
| 2,362,466 | 11/1960 | Parnell | 260—40 |
| 3,174,945 | 3/1965 | Taylor et al. | 260—40 |
| 3,299,171 | 1/1967 | Knoblock et al. | 260—78.3 |

FOREIGN PATENTS

| | | |
|---|---|---|
| 571,322 | 10/1958 | Belgium. |

MORRIS LIEBMAN, *Primary Examiner.*

L. T. JACOBS, *Assistant Examiner.*